US008010690B2

(12) United States Patent
Finger et al.

(10) Patent No.: US 8,010,690 B2
(45) Date of Patent: Aug. 30, 2011

(54) ARRANGEMENT FOR CONNECTIVITY WITHIN AN ADVANCED MULTIMEDIA CONTENT FRAMEWORK

(75) Inventors: James C. Finger, Kirkland, WA (US); Peter J. Torr, Kirkland, WA (US); Praful Pratap Chavda, Redmond, WA (US); Richard E. Doherty, Northridge, CA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 12/146,917

(22) Filed: Jun. 26, 2008

(65) Prior Publication Data

US 2009/0328120 A1 Dec. 31, 2009

(51) Int. Cl.
*G06F 15/16* (2006.01)
*G06F 17/00* (2006.01)
(52) U.S. Cl. .......................................... 709/231; 463/42
(58) Field of Classification Search .................. 709/201, 709/204, 217, 219, 231; 463/41, 42
See application file for complete search history.

(56) References Cited

U.S. PATENT DOCUMENTS

| 2004/0097287 | A1* | 5/2004 | Postrel ............................. 463/41 |
| 2005/0081251 | A1 | 4/2005 | Walker et al. |
| 2006/0149850 | A1* | 7/2006 | Bowman ........................ 709/231 |
| 2006/0287106 | A1 | 12/2006 | Jensen |
| 2007/0006065 | A1 | 1/2007 | Jewsbury et al. |
| 2007/0091168 | A1 | 4/2007 | Lee |
| 2007/0218997 | A1 | 9/2007 | Cho |
| 2008/0002950 | A1* | 1/2008 | Ando et al. ..................... 386/109 |
| 2008/0162665 | A1* | 7/2008 | Kali ............................... 709/217 |
| 2008/0162668 | A1* | 7/2008 | Miller ............................ 709/219 |
| 2008/0177822 | A1* | 7/2008 | Yoneda .......................... 709/202 |
| 2009/0106357 | A1* | 4/2009 | Igelman et al. ................ 709/203 |
| 2009/0150553 | A1* | 6/2009 | Collart et al. .................. 709/229 |

FOREIGN PATENT DOCUMENTS

WO    WO 0043999 A2 *  7/2000
WO       2007063505 A2    6/2007

OTHER PUBLICATIONS

"HDi (interactivity)", Wikipedia, the free encyclopedia, http://en.wikipedia.org/wiki/HDi_Interactive_Format, printed Jan. 22, 2008, p. 1-3.
"Windows Live", Wikipedia, the free encyclopedia, http://en.wikipedia.org/wiki/Windows_Live, printed Jan. 22, 2008, p. 1-12.

(Continued)

*Primary Examiner* — Yemane Mesfin
(74) *Attorney, Agent, or Firm* — Mayer & Williams P.C.

(57) ABSTRACT

Arrangements and methods are provided that allow integration of connected online services within a high-definition interactive framework, and in particular within an advanced content interactivity layer. In this way, the online services may enjoy enhanced features on an advanced content media device. For example, content running on an advanced content media device may be configured to detect an online service's feature and may thus present the user with additional features that interact with the online service. An advanced content media device may detect another user's advanced content media device through a network, and in particular a media service on the network, allowing chat and synchronized playback of content. Advanced content media devices may vary, but may include, e.g., a multimedia player, a media center, a game console, a personal computer, and so on.

18 Claims, 6 Drawing Sheets

OTHER PUBLICATIONS

"Xbox Live", Wikipedia, the free encyclopedia, http://en.wikipedia.org/wiki/Xbox_Live, printed Jan. 22, 2008, p. 1-13.

"HD DVD", Wikipedia, the free encyclopedia, http://en.wikipedia.org/wiki/HD_DVD, printed Jan. 22, 2008, p. 1-15.

"Create. Manage. Experience" NAB2007—Apr. 16-19, 2007 Las Vegas Convention Center Microsoft Booth #SL2313, http://download.microsoft.com/download/6/1/f/61f4b191-6cdb-4a44-9d28-e7040544f576/NAB2007_Show_Guide.pdf.

"HD DVD Studios to Join Microsoft, Toshiba in Promoting HDi", Oct. 4, 2007, http://www.betanews.com/article//1191528719?do=reply&reply_to=997266.

"HDi: Changing the Way We Make and Watch Movies", Retrieved Oct. 19, 2007.

"Microsoft announces HDi logo to appear on HD DVD products", 2007 http://www.gamesdog.co.uk/news/news.phtml/7142/8166/Microsoft-HDi-logo-appear-products.phtml.

"Microsoft Technology Brings HD DVD to the Mainstream", Jan. 8, 2007. http://www.microsoft.com/presspass/press/2007/jan07/01-08HDDVDMomentumPR.mspx.

"Microsoft: We Will Turn Tide of High-Def DVD Format War!", http://www.digitalmediathoughts.com/index.php?action=expand,12362, Jul. 17, 2007.

"Playstation 3 Gaming Console with 80 GB Hard Drive and MotorStorm Game—Limited Edition", Retrieved Oct. 19, 2007 http://accessories.us.dell.com/sna/productdetail.aspx?sku=A1240780&cs=19&c=us&I=en.

* cited by examiner

ARRANGEMENT FOR CONNECTIVITY WITHIN AN ADVANCED MULTIMEDIA CONTENT FRAMEWORK

BACKGROUND

High definition media, with their high capability for data storage and interactive features, allow users to enjoy a higher quality media experience than prior such media. Besides such sophisticated content, online connected media centers are allowing users to interact in ways that were previously not possible. For example, many users compete together and against others in multiplayer connected games. In fact, while playing computer games has increasingly become a connected social activity, the same is generally less true of other entertainment media. For example, watching movies or slideshows at home are still predominantly disconnected activities. There is no across-the-board platform to enable consistent connectivity across various entertainment platforms or categories. Nor is there such a platform to allow consumption and enjoyment of other features in conjunction with advanced content.

SUMMARY

Arrangements discussed here allow integration of connected services, including online services, within an advanced-content interactive framework, and in particular within an advanced content interactivity layer. In this way, the services may enjoy enhanced features on advanced content-enabled devices, here termed for convenience advanced-content media devices. For example, content running on an advanced content media device may be configured to detect an online service's feature and may thus present the user with additional features that interact with the online service. As another example, a first user's advanced content media device may be configured to detect the online presence of a second user who is associated with the first user, e.g., one on the first user's buddy list, thus enabling chat functionality, synchronized playback of content, and the like. The detection of the second user may be made via instructions from the advanced content itself, such as through a media or game extension. Besides online services, the arrangement may be used without a network connection. For example, the arrangement may allow both a movie and a game on the same disk to be consumed on the same device.

Advanced content media devices may vary, but may be, e.g., a multimedia player, a media center, a game console, a personal computer, and so on. In the case of a game console, the advanced content media device may be termed an advanced content game console.

The arrangement allows consumption of a number of advanced content features, each pertaining to and using one or more extensions. One such extension may allow friends, connected through a network, to perform synchronized playback of movies.

Another extension allows advanced content features along with movie playback, such as an ability to rate a movie, update a movie rental queue, update recommendations, purchase a movie, or the like. Yet another extension may allow a user to take screenshots of a movie they are viewing and post the pictures on a page of a social networking site or other website. Another extension may allow the same user to check if friends on a friends list have the movie on their wish list. Numerous variations will be understood given this teaching.

In a more detailed example, a first user may insert a movie title contained on an optical disc into an advanced content media device, such as a set-top-box DVD player, to start playback. A second user, for example, a friend of the first user, may have started to watch the same title a few minutes previously. The advanced content media device may notify both users so that they can "synchronize" their playback, and each may agree to do so. In this case, both users are watching the same title at the same time, and they may communicate with each other using built-in chat (possibly including text, voice, and/or video) functionality available on each advanced content media device. They may of course also communicate using more traditional means such as a mobile phone.

Further to this exemplary arrangement, the advanced content media device may be configured to allow the users to rate the movie and to select other movies to purchase or rent, and the same may be coordinated via the users' on-line profiles. In addition, if one or more user's advanced content media devices allow, more options may be provided such as the ability to download a trial version of a related game, an interface theme, and so on. For example, where an advanced content media device is a game console, a trial version of a game may be offered.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Figure 1:
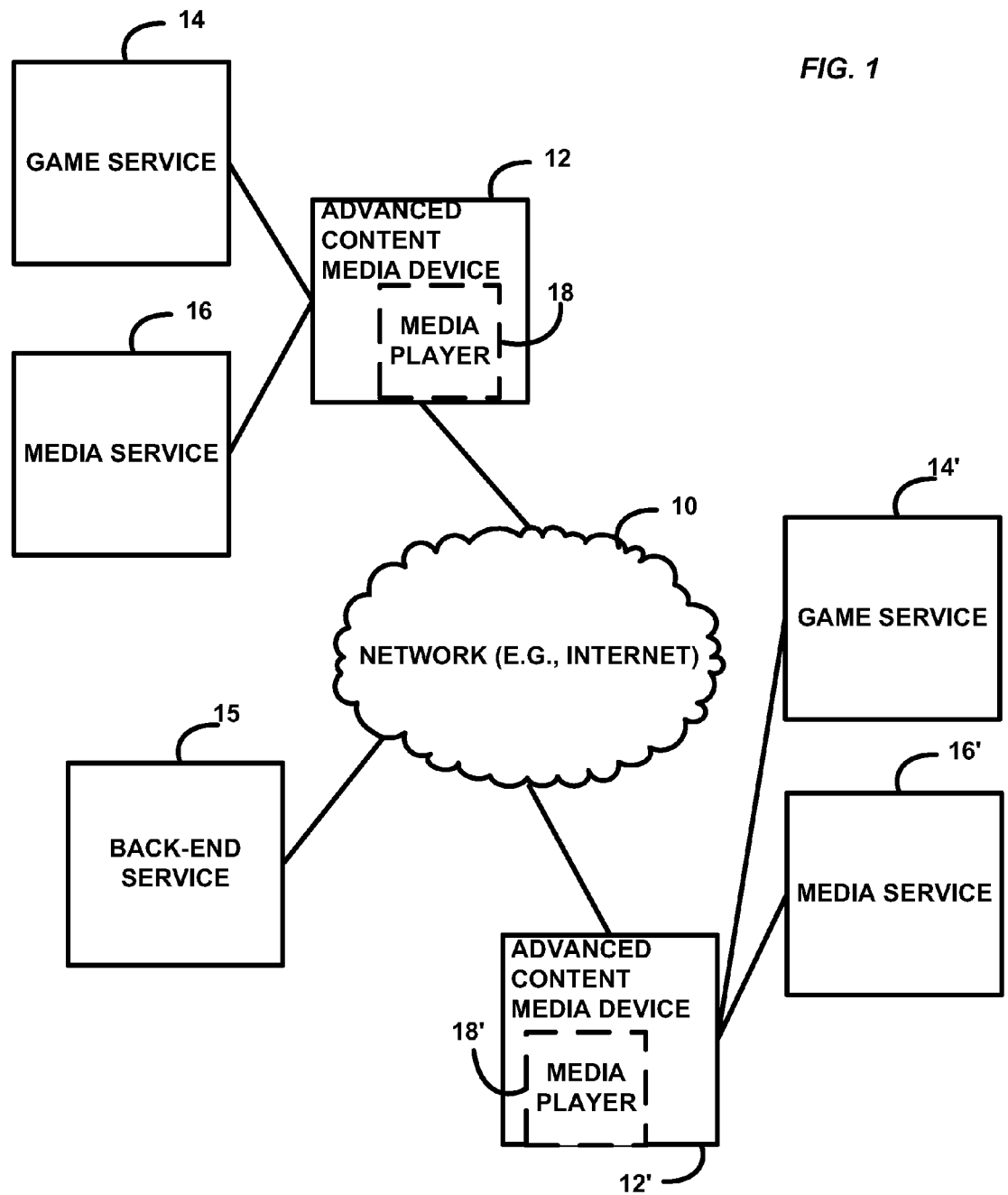
FIG. 1 illustrates a network diagram for an arrangement allowing integration of connected online services within an advanced content interactive framework.

Turning now to the drawings, where like numerals designate like components, FIG. 1 illustrates an arrangement for integration of connected online services within a high-definition interactive framework. A network 10 connects two advanced content media devices 12 and 12' that render content. The network 10 may be the internet, a local area network, a wireless network, or any communications network by which devices may be connected. Each advanced content media device generally is coupled to some sort of output device, such as a monitor, television, audio system, or a combination of these, and each may incorporate at least one user input device, which may be a remote control, keyboard, computer, game controller, and the like. An optional back-end service 15 may be employed to perform administrative functions, such as to keep lists of which users are associated with each other, e.g., group lists or buddy lists.

The advanced content media device 12 may include an optional optical disc or other media player 18 resident within, such as an advanced optical disk player module, or the same may be an external device, e.g., player 18", attached to the advanced content media device 12. The advanced content media device 12 is also shown in communication with an online game service 14 and an online media service 16. Other types of services may also be provided, such as an online marketplace, a social networking site, and so on. Some arrangements may include just one of these services, and some may require neither. In parts of this description, the term "media service" is used as a generic term for game services, services which provide video, audio, or multimedia files, for downloading or streaming, and other such services.

The online game service 14 may be any type of online game service, such as for multiplayer connected games in which players control player characters which compete against each other and against non-player characters. The online media service 16 may be any type of service that provides media, such as those that provide streaming audio, video, or multimedia for subsequent playback on a set-top-box, advanced content media device, and so on. The online media service 16 may further provide game services.

Of course, the description above of the advanced content media device 12 applies as well to the advanced content media device 12' and its primed counterpart elements.

Figure 2:
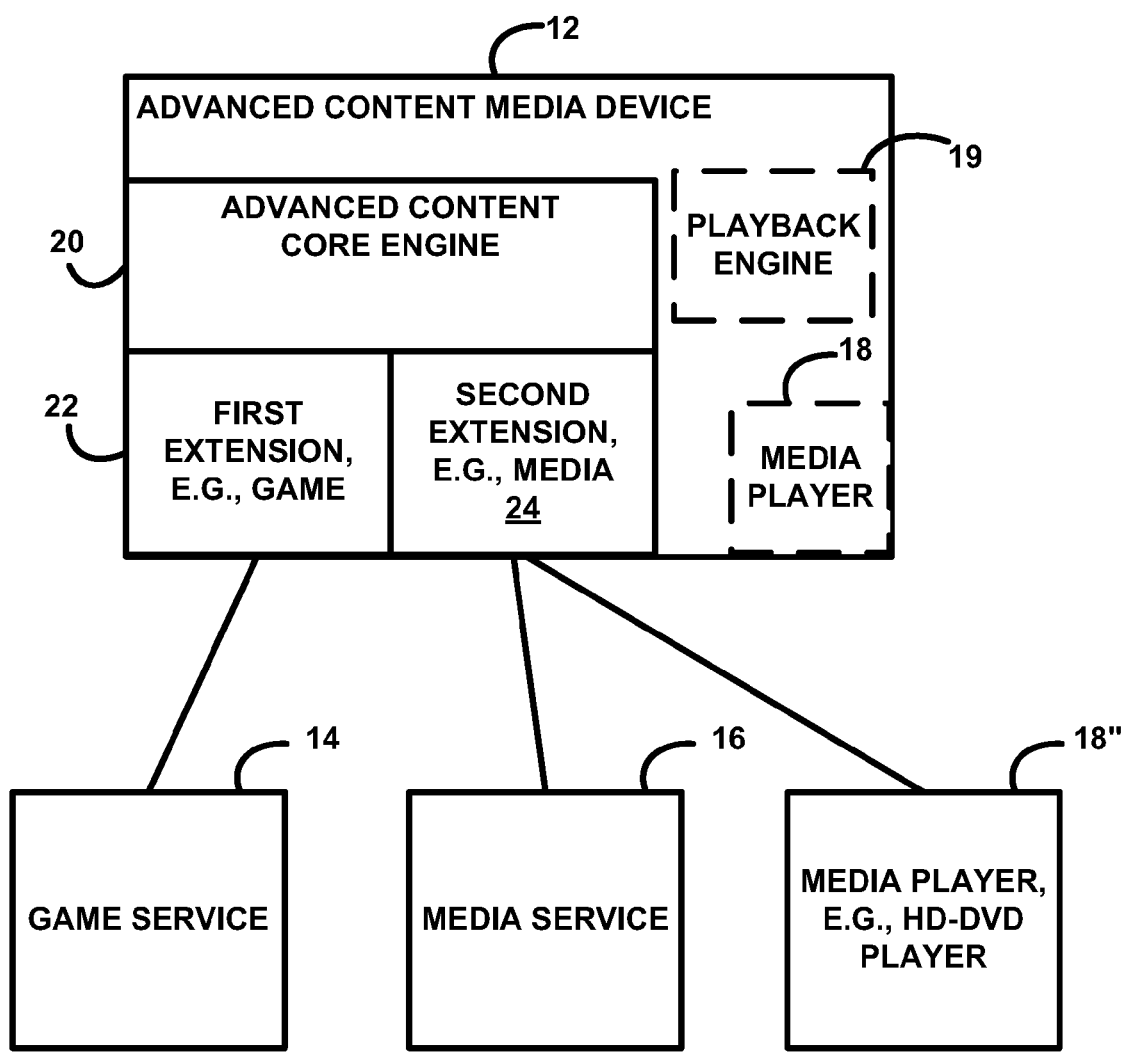
FIG. 2 is a simplified modular diagram of an advanced content media device.

Details of the advanced content media device 12 are shown in FIG. 2, and details of advanced content media device 12', in this exemplary configuration, are analogous. However, it is noted that advanced content media devices may vary in their structure and configuration. An advanced content media device that is a game console may differ from one that is a high-definition disk player, and both may differ from a media center advanced content device. In general, advanced content media devices allow advanced content interactivity, especially for high-definition content, e.g., Silverlight or BD-J content.

"Advanced content", generally stored on advanced media, represents one or more sequences (generally, time-ordered) of video, audio, images, text, and/or graphics presentable to users as media content streams. More than one independently-controlled media content stream may be concurrently presented (for example, a main movie along with features such as a director's commentary, actor biographies, or advertising). The content may include interactive objects, where examples of interactive objects include, among other things, video samples or clips, audio samples or clips, images, graphics, text, and combinations thereof. These interactive objects may be under the control of a sophisticated software program, providing complex control of the interactivity.

The advanced content media device 12 incorporates one or more extensions, which are software that extends the functionality of a system in a way that does not require the existing original code for the advanced content media device to be changed or modified. FIG. 2 shows a first extension 22 and a second extension 24. The first extension 22 is shown for a game service, and allows the advanced content media device 12 to be used with the game service 14. The second extension 24 is shown for a media service, and allows the advanced content media device 12 to be used with the media service 16.

As noted above, a given advanced content media device may incorporate one or both extensions, or may employ entirely different extensions.

In the arrangement, the use of extensions does not necessarily have an online component. For example, a user may play back a DVD that has both a movie and a game thereon. A non-advanced content media device may only play back the movie, while an advanced content media device, e.g., one that employs an extension, may recognize the game content as well and thus may allow the user to both play back the movie and also play the game.

An advanced content core engine 20 generally controls playback of advanced-content titles, e.g., certain high-definition interactive content. In some implementations, a separate engine, here termed a playback engine 19, may control and perform playback of non-advanced-content titles. However, the playback engine 19 may in some cases control playback of even advanced-content titles, such as in the case where it is undesirable to have the advanced content core engine perform playback of the same.

The game, media, or other service may communicate with the advanced content media device 12 and advanced content core engine 20 at several levels. For example, the user may log onto a service using the advanced content media device. This log on may be performed through an on-screen menu, through remote access from a personal computer, or via any other such means in which access is gained to a computer, network, or application, generally by input of a username and password. If desired, the log on information may be persisted on the advanced content media device 12 so that subsequent logons are made more convenient.

Figure 3:
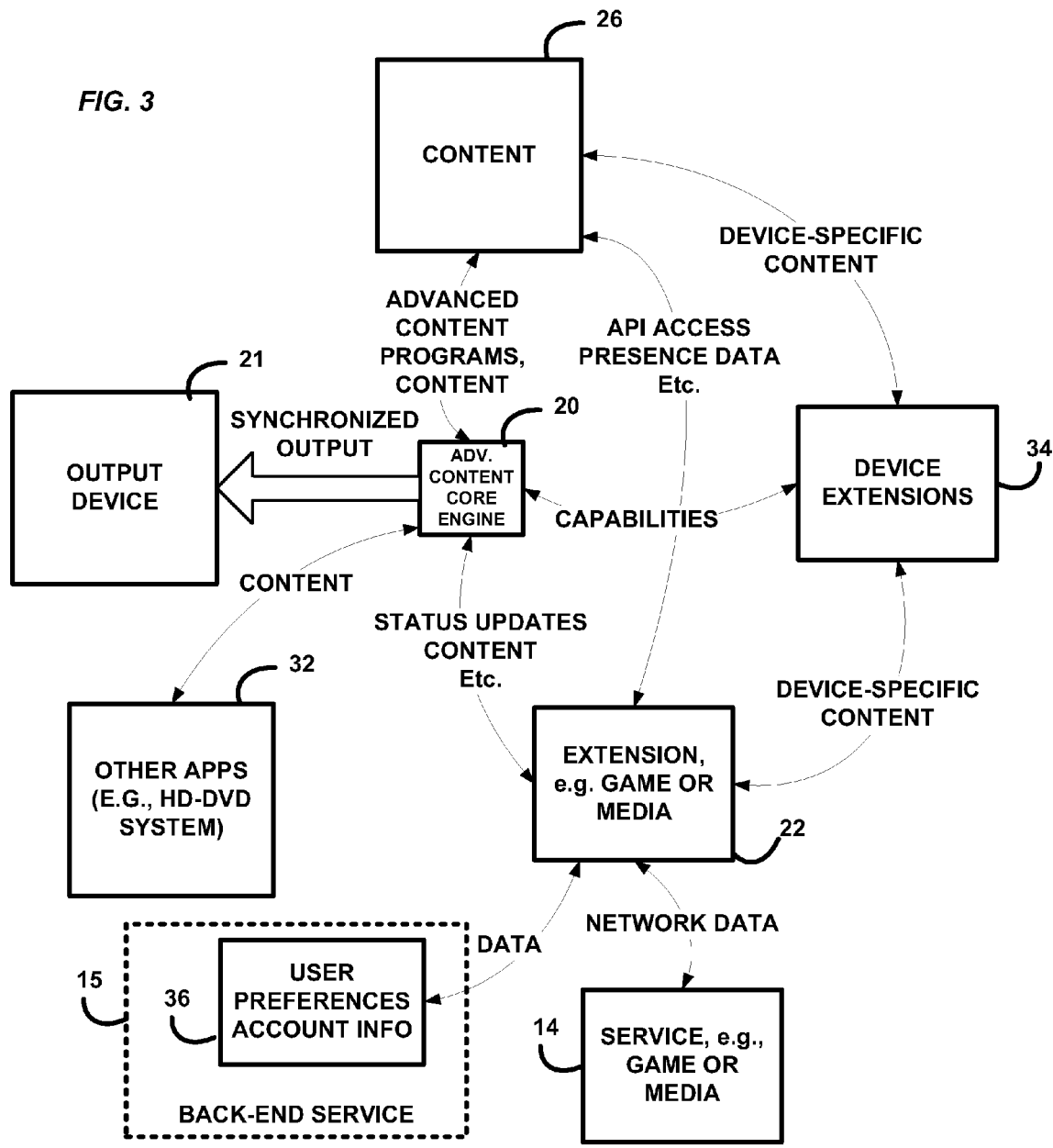
FIG. 3 is a data flow diagram of an arrangement allowing integration of connected online services within an advanced content interactive framework.
Figure 4:
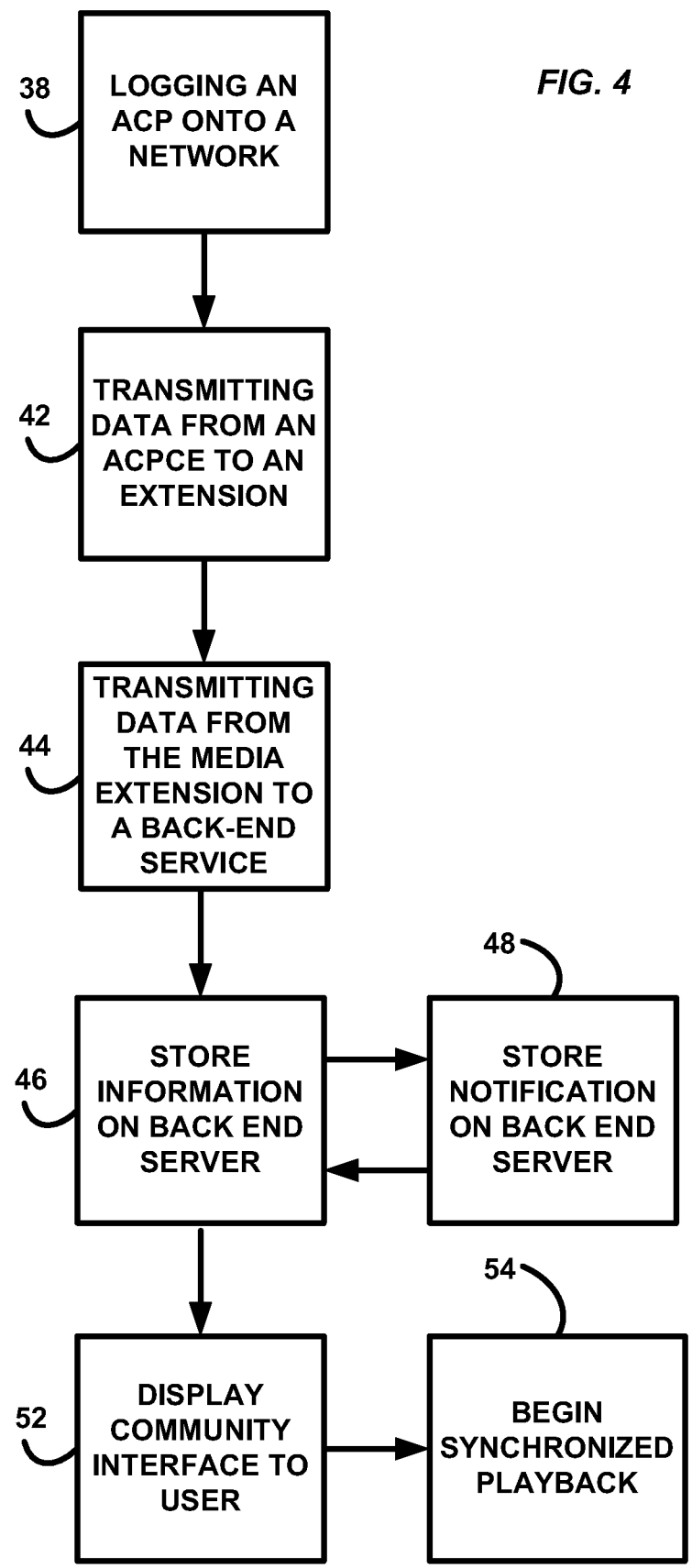
FIG. 4 is a flowchart illustrating a method for integrating connected online services within an advanced content interactive framework.
Figure 5:
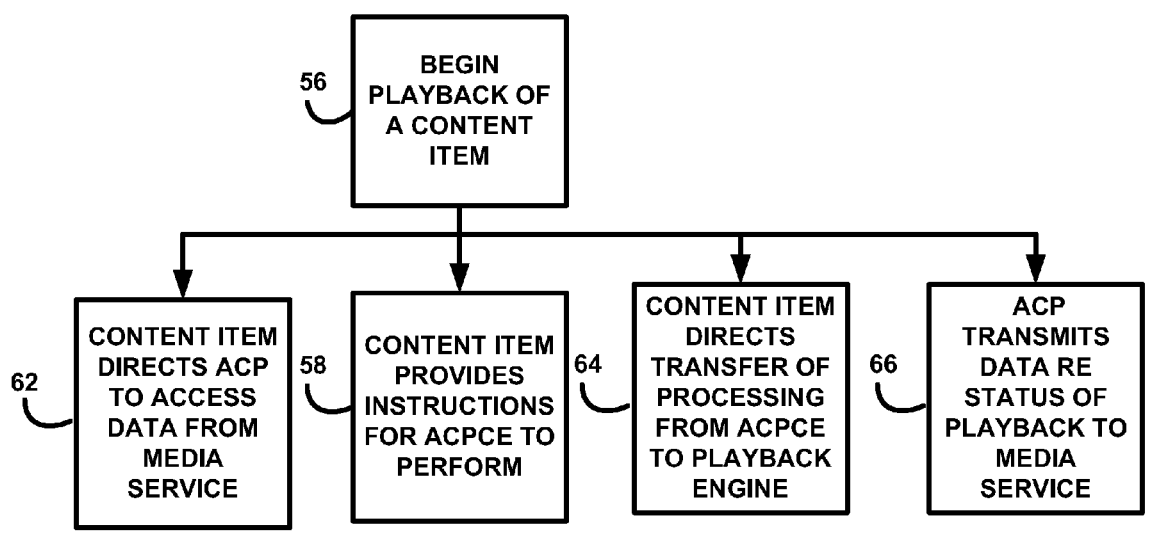
FIG. 5 is a flowchart illustrating another aspect of the method for integrating connected online services within an advanced content interactive framework.

In more detail, and referring to the data flow diagram of FIG. 3 and the flowcharts of FIGS. 4-5, a method is illustrated for integrating connectivity, especially for established online media services, into an advanced content interactive arrangement.

FIG. 3 shows a data flow diagram for the usual situation in which content is being communicated and played back on an output device 21. In particular, the advanced content core engine 20 communicates with the game, media, or other such extension 22, which in turn communicates network and other data with the media service 14, which may be a game or other such service. As noted above, some arrangements need not have online content accessed at all.

In general, whenever the advanced content media device plays back content, the same may locate the game, media, or other such extension (on the advanced content media device) and may connect this extension to the advanced content core engine. It should be noted that there is no need for any particular content: even a generic "nothing is happening" screen may be displayed and controlled by the advanced content media device, and thus the arrangement and method may apply whenever the advanced content media device is powered on.

The data communicated between the advanced content core engine 18 and the extension may include information such as the content being played back, status updates, etc. The data communicated to the advanced content core engine 18 may also include any device-specific capabilities, the same being accessible from device extensions 34, which are codes that extend functionality and connectivity to given devices. Examples of device-specific capabilities may include information about the functionality of the advanced content media device. For example, if the advanced content media device is a game console, information may be transmitted about the capabilities of the game console, and thus customization is enabled of the data transmitted, such as resolution, type of data, format, etc. As another example, if the advanced content media device is a set-top-box that permits streaming media, e.g., Windows Media®, then information may be transmitted about the capabilities of the set-top-box, allowing customization of the streamed media.

Certain applications, shown collectively as element 32, may provide content that is not necessarily online, such as that from a high-definition disk player.

For online applications, the game, media, or other extension 22 may then communicate via network 10 to a back-end service 15. In one implementation (not shown), the back-end service 15 may be associated with the game, media, or other service, or in another implementation may be a separate entity. The back-end service 15 may perform a number of functions for a given user, here termed the "subject user". For example, the back-end service 15 may provide data such as user preference and account information, shown collectively in FIG. 3 as element 36, and may employ the same to update the user's presence, such as to determine whether the user is online, e.g., with the advanced content media device powered on and connected, as well as noting what content is currently being played back. The back-end service 15 may also check the status of any other users associated with the subject user, e.g., may check the user's group or buddy list, for information such as whether any of the users on the list are playing back the same content as the subject user. For this as well as other functions, the back-end service 15 may again refer to the user preferences and account information 36, which may be stored on the back-end service 15 or may be otherwise accessible thereto.

The back-end service 15 may further check for any new electronic messages for the subject user, such as administrative messages from the back-end service or messages from other users. The back-end service 15 may even further provide new content so as to augment the content currently being played back by the subject user.

The game, media, or other extension may display a user interface by which the user may read messages, contact any associated users, e.g., from the buddy list and using a private or group chat functionality, propose or organize a synchronized group playback of content, and so on. The user interface employed may have such functionality preset by the arrangement, customized or selected by the user, or a portion may be preset and another portion customized or selected by the user. The extension displays the user interface using an appropriate code that is interpreted by the advanced content core engine in the same way that any other advanced content media device applications would be interpreted. In this way, the extension need not supply or otherwise provide a separate mechanism for interfacing with the user.

The game, media, or other extension may then expose one or more new entities to the advanced content media device. These new entities may be used by content that is appropriate game- or media-aware. For example, new APIs, environment variables, etc., may be made available to the content. In addition, if a user desires to share such information with a given title, then information such as the user's screen name and buddy list may be made available.

Content may expose two or more versions of an interactive experience where each is tailored to work with (or without), certain extensions, and whereby the player decides which version to load by matching metadata stored with the content to the capabilities of, and extensions provided by, the device. In other words, content may have a basic version of an application as well as a more sophisticated version. The player may then choose which application to run based on metadata on the disk that the application matches to capabilities of the player, with more sophisticated devices running the sophisticated application and more basic devices running the more basic application.

If content is specifically designed for a game, media, or other service, then that content may perform various actions related to the service. For example, the content may provide interactions with other users as described elsewhere in this specification. In addition, the content may facilitate online transactions via a user's online identity. Moreover, the content may allow access to content not related to the advanced content media device, e.g., a related game or music video that may be downloaded. Other additional actions may also be facilitated by such content. The content driving such actions is indicated in FIG. 3 by content block 26 and the data flows attached to the same.

It should be noted that while such content may provide the additional functionality or perform additional functions, other content, lacking such features, may still be played back. In this case, the extensions have lesser or no impact on the played back content. The extensions may still work to an extent with the content, but may not be as integrated into the overall content experience, e.g., they may only provide a pop-up modal experience.

In addition to enhanced functionality, a game, media or other extension may allow, in some implementations, the content to transfer control away from the advanced content core engine and to another part of the device, such as playback engine 19. For example, if the advanced content media device is a game console, and the content includes a game written in the native executable format of the game console, rather than in the language of the advanced content core engine 18, then the content may cause transfer of the control of the playback to the playback engine 19, in this example the game console engine, in order to play back the game. Similarly, if the advanced content media device supports streaming media, e.g., streaming Windows® Media, whether from a media service or even from a game service, then the content may transfer control to that interface, e.g., to that playback engine 19, in order to view the streamed media, e.g., a trailer of an upcoming sequel.

It is noted in this regard that content playback does not depend on the type of advanced content media device. For example, an advanced content media device that is a game console may play back streamed media from a media service. Conversely, an advanced content media device that is not a game console may play back certain content, e.g., streamed media, from a game service.

During playback, the advanced content core engine 18, the extension 22 or 24 (whether a game, media, or other such extension), and the service 14 or 16 may communicate data pertaining to a variety of information types. First, such communications may be performed in order to keep the game, media, or other service current with respect to the state of the playback. For example, a user's state of playback may be that they are watching a given chapter of the title, or they may have paused playback. In any case, the game, media, or other service may use this data in order to apportion resources or for any other reason.

Information may also be used to notify the advanced content core engine and the extension of the status of the game, media, or other such service, as well as the status of the user's online identity. For example, additional content may become available and the same may be made available to the user. As another example, the user may be made aware of the online presence of a user on their buddy list. The users may then chat via chat functionality, arrange for synchronized playback of content, and so on.

In any case, the content may use the information to perform a number of actions. Such actions may be specific to that content title. Alternatively, the advanced content media device may automatically perform certain actions such as displaying notifications to a user or updating the user's online presence information. In certain implementations, such actions may be configured to be dependent upon user input and consent.

FIG. 4 shows a flowchart of a specific method for integrating online services with advanced content interactivity, in particular, for synchronized viewing. It will be noted that this is purely exemplary, and that the arrangement may apply to any situation in which advanced content may expand or enhance a user's consumption experience.

In this example, in a first step of the method, a first advanced content media device is logged onto a network, where the advanced content media device includes the advanced content core engine noted above as well as at least one media extension for connection to a media service (step 38). The media extension may be a game extension and the media service may be a game service. The media extension need not be of the same variety as the media service.

Data is then transmitted from the advanced content core engine to the media extension, where the data item may include a content item and a device extension (step 42). Data may then be transmitted from the media extension to the back end service (step 44), the data including user identity information as well as status information about the advanced content media device. User information may be stored on the back end service (step 46), as well as a notification trigger (step 48). The notification trigger may be, e.g., a list of users associated with the subject user, such that when the subject user and a user from the list are both logged on at the same time, the occurrence of the trigger is noted and one or each may receive an indication that the other is logged on, and thus available for chat, synchronized content playback, and so on.

As noted above, a community interface may be displayed to the user (step 52), and this interface may include a message list, a list of group members, including which if any are online, if any group members or non-group members are watching the same content as the user, if any new content is available for playback by the user, if any content associated with content owned by the user is available, e.g., a trailer of a sequel to played-back content, and so on. Following display of this interface, a user may choose to invite a member of their group to watch a title in a synchronized fashion (step 54), with an optional open chat channel set up to allow the two (or more) to comment during playback of the content.

Referring to the flowchart of FIG. 5, upon content playback (step 56), a variety of additional actions may be taken. It is noted that one, two, or more actions may be combined or performed sequentially. One action is that the content item may cause the advanced content core engine to perform instructions associated with the content item (step 58), such as to provide a level of interactivity with the user. Another action is that the advanced content media device may be caused to access data from the media service (step 62), such data including that required or useful in determining the status of other users, facilitating online transactions, accessing content, and so on. Another action, as noted above, is that the content may direct that processing be transferred to a playback engine, rather than the advanced content core engine (step 64). A further action may be that the advanced content media device or extension are caused to transmit data about the status of the playback to the media service (step 66).

The above has described an arrangement for playback of content as well as consumption of advanced content. Certain specific examples have been provided, but it will be clear given this teaching that numerous variations of these examples exist, and that these and numerous other applications may be performed by the arrangement.

Figure 6:
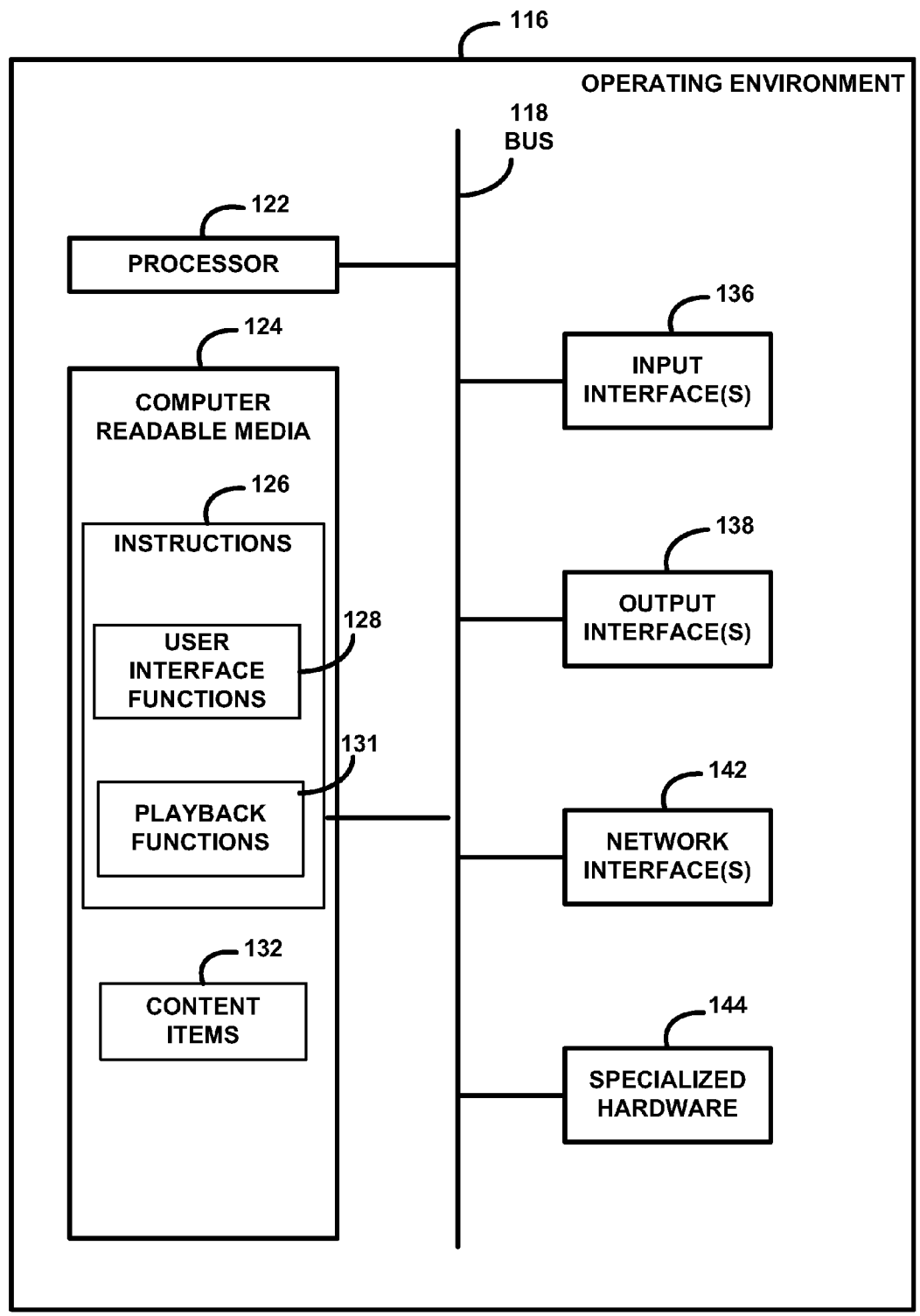
FIG. 6 is a simplified functional block diagram of an exemplary configuration of an operating environment in which the integration arrangement for connected online services within an advanced content interactive framework may be implemented or used.

FIG. 6 is a block diagram of an exemplary configuration of an operating environment 116 (such as a client-side device or application or a networked server or service) in which all or part of the arrangement for integrating connected online services within an advanced-content interactive framework and/or the methods shown and discussed in connection with the figures may be implemented or used. Operating environment 116 is generally indicative of a wide variety of general-purpose or special-purpose computing environments, and is not intended to suggest any limitation as to the scope of use or functionality of the arrangements described herein.

As shown, operating environment 116 includes processor 122, computer-readable media 124, and computer-executable instructions 126. One or more internal buses 118 may be used to carry data, addresses, control signals, and other information within, to, or from operating environment 116 or elements thereof.

Processor 122, which may be a real or a virtual processor, controls functions of the operating environment by executing computer-executable instructions 126. The processor may execute instructions at the assembly, compiled, or machine-level to perform a particular process.

Computer-readable media 124 may represent any number and combination of local or remote devices, in any form, now known or later developed, capable of recording, storing, or transmitting computer-readable data, such as the above-noted computer-executable instructions 126, including user interface functions 128 and content playback functions 131. Computer-readable media 124 may also include content objects 132, such as content items, maps, application properties such as game properties, and so on. In particular, the computer-readable media 124 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 126 represent any signal processing methods or stored instructions. Generally, computer-executable instructions 126 are implemented as software components according to well-known practices for component-based software development, and encoded in computer-readable media. Computer programs may be combined or distributed in various ways. Computer-executable instructions 126, however, are not limited to implementation by any specific embodiments of computer programs, and in other instances may be implemented by, or executed in, hardware, software, firmware, or any combination thereof.

Input interface(s) 136 are any now known or later developed physical or logical elements that facilitate receipt of input to operating environment 116.

Output interface(s) 138 are any now known or later developed physical or logical elements that facilitate provisioning of output from operating environment 116.

Network interface(s) 142 represent one or more physical or logical elements, such as connectivity devices or computer-executable instructions, which enable communication between operating environment 116 and external devices or services, via one or more protocols or techniques. Such communication may be, but is not necessarily, client-server type communication or peer-to-peer communication. Information received at a given network interface may traverse one or more layers of a communication protocol stack.

Specialized hardware 144 represents any hardware or firmware that implements functions of operating environment 116. Examples of specialized hardware include encoder/decoders, decrypters, application-specific integrated circuits, clocks, and the like.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being applications or computer programs are not limited to implementation by any specific embodiments of computer programs. Rather, such functions/components are processes that convey or transform data, and may generally be implemented by, or executed in, hardware, software, firmware, or any combination thereof. For example, any of the above may be employed to implement the advanced content core engine, the playback engine, and the various extensions. An example of the advanced content core engine is the HDi™ interactivity framework, also termed Advanced Content. A specific example of a game extension is an Xbox Live® extension. A specific example of a media extension is a Windows Live™ extension.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

For example, while much of the description has focused on advanced content connected with a movie on a DVD, it will be understood that the use of extensions may apply to advanced content connected with any other sort of content, including television shows, educational materials, or the like.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A non-transitory computer-readable storage device, containing instructions which, when executed by one or more processors disposed in an electronic device, perform a method for operating an advanced content media device in conjunction with a media service through a media extension, the method comprising the steps of:
   a. logging a first advanced content media device onto a network, the first advanced content media device having an advanced content core engine and at least one media extension for connection to a media service, and in which the network further includes a back-end server in communication with the first advanced content media device, the media extension comprising computer-executable instructions for permitting the advanced content media device to be used with the media service without modifying the advanced content media device;
   b. transmitting data from the advanced content core engine to the media extension, in which the data includes a content item and a device extension comprising information relating to the functionality of the advanced content media device;
   c. transmitting data from the media extension to the back-end server, the data including user identity information and advanced content media device status information; and
   d. upon receipt of an instruction from the media extension, displaying a community interface to a user, wherein the community interface includes an element selected from the group consisting of: a message list; a list of group members; a list of group members that are currently on-line; if content is being played back by the advanced content media device, a list of group members currently playing back the same content as the advanced content media device; and if content is being played back by the advanced content media device, a list of downloadable or streamable content associated with the content being played back by the advanced content media device.

2. The computer-readable storage device of claim 1, in which the method further comprises storing on the back-end server at least one notification trigger associated with the first advanced content media device, in which upon an occurrence of the notification trigger the first advanced content media device displays a first indication of the notification trigger.

3. The computer-readable storage device of claim 1, in which the media service includes the back-end server.

4. The computer-readable storage device of claim 1, in which the media service is a game service, an online marketplace, or a social networking service.

5. The computer-readable storage device of claim 2, in which the notification trigger includes logging a second advanced content media device onto the network, the second advanced content media device associated with the first advanced content media device.

6. The computer-readable storage device of claim 5, in which the second advanced content media device is listed in a group associated with the first advanced content media device or in which the first advanced content media device is listed in a group associated with the second advanced content media device.

7. The computer-readable storage device of claim 5, in which the method further comprises:
   a. displaying a second indication of the notification trigger on the second advanced content media device; and
   b. displaying at least one user option on each of the first and second advanced content media devices.

8. The computer-readable storage device of claim 7, in which the user option is to begin a synchronized playback of a content item, the playback synchronized between the first and second advanced content media devices.

9. The computer-readable storage device of claim 1, in which the content item is played back, and in which the advanced content core engine performs instructions associated with the content item.

10. The computer-readable storage device of claim 9, in which the instructions cause the advanced content media device to access data from the media service.

11. The computer-readable storage device of claim 10, in which the data is selected from the group consisting of: at least one status of another user; perform an online transaction using an identity associated with the media service; and access content.

12. The computer-readable storage device of claim 9, in which the instructions cause the advanced content media device to transfer processing of the content from the advanced content core engine to a playback engine.

13. The computer-readable storage device of claim 1, in which if the content item is played back, the method further comprises transmitting data corresponding to a status of the playback to the media service.

14. An advanced content media device configured for connection through a network to a media service or to another advanced content media device, comprising:
   one or more non-transitory computer-readable storage media;
   an advanced content core engine for playing back content, the advanced content core engine being implemented, at least in part, using instructions stored on the one or more computer-readable media disposed in the advanced content media device;
   a playback engine for playing back content, the playback engine being implemented, at least in part, using instructions stored on the one or more computer-readable media disposed in the advanced content media device; and
   at least one media extension associated with communications with a media service, the media extension comprising computer-executable instructions for permitting the advanced content media device to be used with the media service and the other advanced content media device without modifying the advanced content media device,
   wherein, upon receipt of an instruction from the media extension, a community interface is displayed to a user, wherein the community interface includes an element selected from the group consisting of: a message list; a list of group members; a list of group members that are currently on-line; if content is being played back by the advanced content media device, a list of group members currently playing back the same content as the advanced content media device; and if content is being played back by the advanced content media device, a list of downloadable or streamable content associated with the content being played back by the advanced content media device.

15. The advanced content media device of claim 14, in which the media service is a game service.

16. The advanced content media device of claim 14, in which the media extension is a game extension.

17. The advanced content media device of claim 14, further comprising a module for receiving and playing back content from an optical disk.

18. An advanced content media device comprising:
   one or more non-transitory computer-readable storage media;
   an advanced content core engine for playing back content, the advanced content core engine being implemented, at least in part, using instructions stored on the one or more computer-readable media disposed in the advanced content media device;
   a playback engine for playing back content, the playback engine being implemented, at least in part, using instructions stored on the one or more computer-readable media disposed in the advanced content media device; and
   at least one media extension associated with communications with a media service, d. such that the playback engine is capable of playing back content and the at least one media extension comprises computer-executable instructions for allowing, at least partially in conjunction with the advanced content core engine, an accessing and consumption of at least one advanced content feature on an advanced content medium without modifying the advanced content media device,
   wherein, upon receipt of an instruction from the media extension, a community interface is displayed to a user, wherein the community interface includes an element selected from the group consisting of: a message list; a list of group members; a list of group members that are currently on-line; if content is being played back by the advanced content media device, a list of group members currently playing back the same content as the advanced content media device; and if content is being played back by the advanced content media device, a list of downloadable or streamable content associated with the content being played back by the advanced content media device.

* * * * *